US012617311B2

(12) United States Patent
Panainte

(10) Patent No.: US 12,617,311 B2
(45) Date of Patent: May 5, 2026

(54) VEHICLE ASSISTANCE VIA ONE OR MORE CONTENT DELIVERY MODES

(71) Applicant: Mercedes-Benz Group AG, Stuttgart (DE)

(72) Inventor: Sorin Panainte, Holland, MI (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 626 days.

(21) Appl. No.: 18/149,939

(22) Filed: Jan. 4, 2023

(65) Prior Publication Data

US 2024/0217376 A1 Jul. 4, 2024

(51) Int. Cl.
B60L 53/66 (2019.01)
B60L 53/14 (2019.01)
B60L 58/12 (2019.01)

(52) U.S. Cl.
CPC .............. B60L 53/66 (2019.02); B60L 53/14 (2019.02); B60L 58/12 (2019.02); *B60L 2250/16* (2013.01); *B60L 2250/30* (2013.01)

(58) Field of Classification Search
CPC .......... B60L 53/66; B60L 53/14; B60L 58/12; B60L 2250/16; B60L 2250/30
See application file for complete search history.

(56) References Cited

U.S. PATENT DOCUMENTS

| | | | | |
|---|---|---|---|---|
| 12,039,523 | B2 * | 7/2024 | Sarubbi | G06Q 30/0279 |
| 2020/0143593 | A1 * | 5/2020 | Rudman | G06T 19/006 |
| 2023/0043446 | A1 * | 2/2023 | Salter | B60L 53/60 |
| 2024/0140264 | A1 * | 5/2024 | Ropel | H01M 10/425 |

FOREIGN PATENT DOCUMENTS

| | | |
|---|---|---|
| CN | 108983638 A | 12/2018 |
| CN | 109285052 A | 1/2019 |
| JP | 2012032354 A | 2/2012 |

* cited by examiner

*Primary Examiner* — Carlos Amaya
(74) *Attorney, Agent, or Firm* — Dority & Manning, P.A.

(57) ABSTRACT

Briefly, example methods, apparatuses, and/or articles of manufacture may include a vehicle assistance controller to convey content to one or more display devices. The vehicle assistance controller may operate to access a user input device to determine an assistance topic for charging and/or discharging one or more energy storage elements (e.g., one or more batteries) of the vehicle. The vehicle assistance controller may additionally operate to determine a delivery mode for the content, which is applicable to the assistance topic, based on the access of the user input device, and to deliver the content to the one or more display devices via the determined delivery mode.

18 Claims, 7 Drawing Sheets

200

300

400 —

145

405

102

1. Locate Charger Port
   (Left Rear Quarter Panel)
2. Open Port Hatch
3. Locate EV Charger Connector
   ⋮

500 —

Dashboard - 505

Infotainment Display 140

⋮

3. Locate EV Charger Plug

⋮

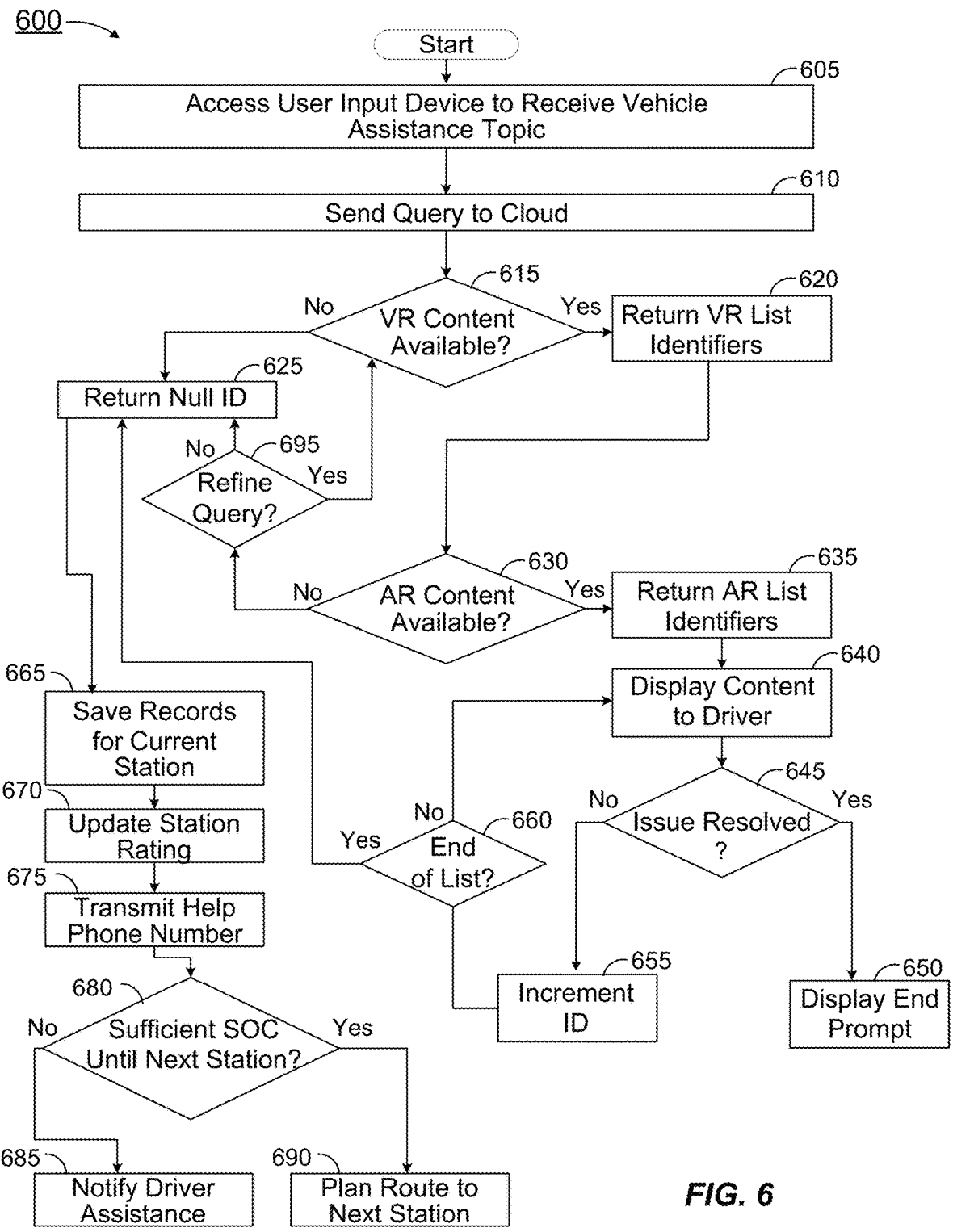

600

Start

605
Access User Input Device to Receive Vehicle Assistance Topic

610
Send Query to Cloud

615
VR Content Available?
No
Yes

620
Return VR List Identifiers

625
Return Null ID

695
Refine Query?
No
Yes

630
AR Content Available?
No
Yes

635
Return AR List Identifiers

640
Display Content to Driver

645
Issue Resolved?
No
Yes

665
Save Records for Current Station

670
Update Station Rating

675
Transmit Help Phone Number

660
End of List?
Yes
No

655
Increment ID

650
Display End Prompt

680
Sufficient SOC Until Next Station?
No
Yes

685
Notify Driver Assistance

690
Plan Route to Next Station

```
                                                          ┌─705
┌──────────────────────────────────────────────────────────┐
│  Access a user input device to determine an assistance     │
│  topic for charging and/or discharging one or more energy  │
│  storage elements of an electrified vehicle                │
└──────────────────────────────────────────────────────────┘
                           │
                           ▼                              ┌─710
┌──────────────────────────────────────────────────────────┐
│  Determine a content delivery mode which is applicable to  │
│  the assistance topic via, or based on, the access to the  │
│  user input device                                          │
└──────────────────────────────────────────────────────────┘
                           │
                           ▼                              ┌─715
┌──────────────────────────────────────────────────────────┐
│  Deliver the content to the one or more display devices via │
│  the determined delivery mode                               │
└──────────────────────────────────────────────────────────┘
```

902
First Device
(E.g., AR Device 145,
Infotainment Display
140)

830
Network

906
Third Device
(E.g., Vehicle Assistance
Content Generator - 320)

904
Second Device (E.g., Vehicle Assistance Delivery Mode
Controller - 135)

930
Communication
Interface

932
Input/ Output

940
Computer-
Readable
Medium

Bus 915

920
Processing
Unit

922

925
Primary
Memory

926
Secondary
Memory

Memory

VEHICLE ASSISTANCE VIA ONE OR MORE CONTENT DELIVERY MODES

BACKGROUND

1. Field

The present disclosure relates generally to delivery of content via augmented reality (AR) devices and/or virtual reality (VR devices), as such devices may be utilized to present vehicle-assistance content to an individual, such as a driver of an electrified vehicle.

2. Information

Electrified vehicles have vastly increased in popularity over the past several years at least partially due to the ever-increasing number of features available in these types of vehicles. It may be appreciated that in comparison with the electrified vehicles manufactured, perhaps, just a few years ago, the electrified vehicles of today provide a wide variety of features that were not even conceived of by early designers of such vehicles. Such innovations include solid-state batteries, advanced motor controllers to provide enhanced driving range, autonomous vehicle driving, alternating-current (AC) voltage supplies for powering laptops and tools, and a host of other features. As investments continue to be made in electrified vehicle research and development, the electrified vehicles of tomorrow are likely to include additional features that are expected to make electrified vehicles even more attractive.

However, as the features available in electrified vehicles increase, complexity of certain aspects of maintaining an electrified vehicle may also increase. For example, although many electrified vehicles facilitate bidirectional charging, in which energy stored within the batteries of an electrified vehicle may be used to provide primary AC power to power one or more pieces of external equipment, many drivers of electrified vehicles may be unsure as to how to initiate such bidirectional operations. In another example, in view of the availability of various modes for charging electrified vehicles, many drivers may become familiar with some charging operations, such as household charging operations, but may be unfamiliar with other charging options, such as those encountered at commercial (e.g., roadside) charging stations. In addition, since charging current cannot be viewed in the same manner as gasoline or diesel fuel being dispensed into a fuel tank for delivery to an internal combustion engine, it may sometimes be difficult to determine whether an electric current is actually conducting between, for example, electrified vehicle supply equipment and the batteries of the electrified vehicle. Thus, simplifying electrified vehicle charging operations, and/or providing instructions to electrified vehicle drivers and/or operators, continues to be an active area of investigation.

SUMMARY

One general aspect includes a vehicle assistance controller to convey content to one or more display devices of, or in communication with, a vehicle. The vehicle assistance controller may include at least one memory device to store computer program code and one or more processors communicatively coupled to the at least one memory device, which, responsive to executing the computer program code, access a user input device to determine an assistance topic for charging and/or discharging one or more energy storage elements of the vehicle. The vehicle assistance controller may additionally determine a delivery mode for the content, which is applicable to the assistance topic, via or based on the access of the user input device. The vehicle assistance controller may also operate to deliver the content to the one or more display devices via the determined delivery mode. Other embodiments of this aspect include one or more corresponding methods, apparatuses, and computer program instructions encoded on one or more computer storage devices, each configured to perform the operations of the one or more methods.

In particular embodiments, the one or more processors communicatively coupled to the at least one memory device are further to access one or more cloud-based data storage devices to deliver the content applicable to the assistance topic via the determined delivery mode. In particular embodiments, the one or more display devices includes an augmented reality display device. In particular embodiments, the one or more display devices includes a virtual reality display device. In particular embodiments, the one or more processors communicatively coupled to the at least one memory device are further to overlay additional content responsive to access of the user input device to obtain one or more additional user input signals to refine or update the assistance topic. In particular embodiments, the overlaid content includes text and or graphics. In particular embodiments, the user input device includes a host application executed utilizing a mobile communications device. In particular embodiments, the one or more processors communicatively coupled to the at least one memory device are additionally to initiate generation of a message to the mobile communications device to indicate status of charging and/or discharging of the one or more energy storage elements of the vehicle. In particular embodiments, the one or more processors communicatively coupled to the at least one memory device are additionally to determine whether the one or more energy storage elements of the vehicle include sufficient state of charge (SOC) to route the vehicle from a first charging station to one or more second charging stations. In particular embodiments, the one or more processors communicatively coupled to the at least one memory device are additionally to determine whether the assistance topic relates to charging of the one or more energy storage elements of the vehicle or relates to discharging of the one or more energy storage elements of the vehicle to provide power to one or more pieces of external equipment. In particular embodiments, the user input device includes a microphone to receive voice signals from a user of the user input device. Implementations of the described techniques may include one or more methods or processes, systems and/or apparatuses to perform operations of the methods, and computer program instructions encoded on a non-tangible computer-accessible medium.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, may best be understood by reference to the following detailed description if read with the accompanying drawings in which:

FIGS. 6-7 are first and second flowcharts for methods of vehicle assistance via one or more content delivery modes, according to an embodiment;

Figure 1:
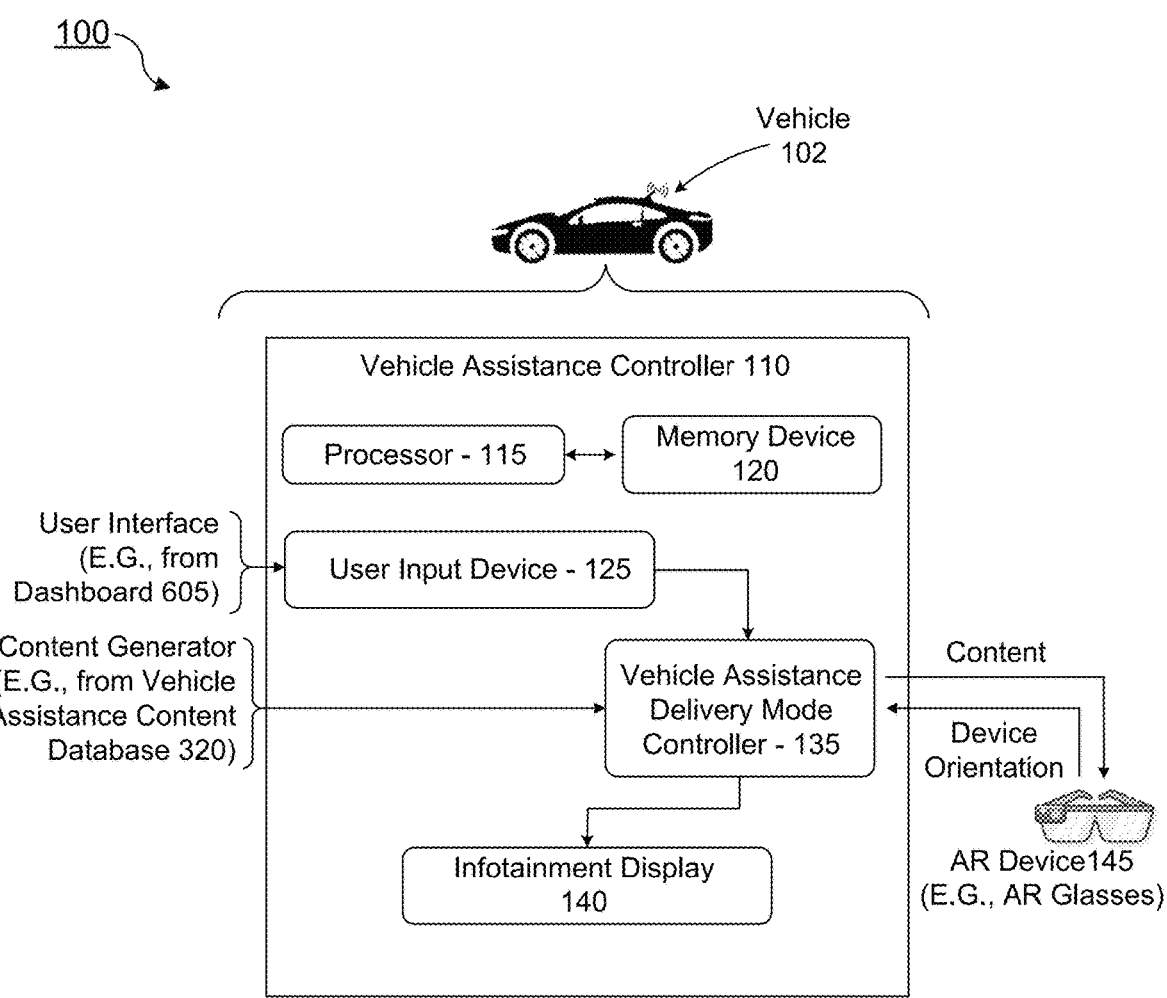
FIG. 1 is a diagram of an electrified vehicle having wireless connectivity with a communications infrastructure and coupled to one or more content display devices for delivering vehicle assistance, according to an embodiment.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Throughout this specification, references to one implementation, an implementation, one embodiment, an embodiment, and/or the like, means that a particular feature, structure, characteristic, and/or the like described in relation to a particular implementation and/or embodiment is included in at least one implementation and/or embodiment of claimed subject matter. Thus, appearances of such phrases are not necessarily intended to refer to the same implementation or embodiment or to any one particular implementation or embodiment. Furthermore, it is to be understood that particular features, structures, characteristics, or the like described, are capable of being combined in various ways in one or more implementations and/or embodiments and, therefore, are within intended claim scope. In general, for the specification of a patent application, these and other issues have a potential to vary in a particular circumstance of usage. In other words, throughout the disclosure, particular circumstances of description and/or usage provides guidance regarding reasonable inferences to be drawn. The phrase "as the term is used herein" in general without further qualification refers at least to the setting of the present patent application.

As previously alluded to, electrified vehicles have vastly increased in popularity over the past several years at least partially due to the ever-increasing number of features available in these types of vehicles. Further, owning an electrified vehicle greatly simplifies the process for storing energy in the electrified vehicle's energy storage devices (e.g., batteries), which removes the occasional or periodic need to drive the vehicle to an appropriate fueling station so that the vehicle's gasoline/fuel tank can be loaded with combustible fuel. It may also be appreciated that electrified vehicles may provide a driving experience that is, in many respects, superior to that of driving a vehicle equipped with an internal combustion engine in that, for example, dual or multi-motor direct electrified vehicle drive systems may provide superior torque in comparison with torque provided by internal combustion engines. These innovations, and others, such as solid-state batteries, advanced motor controllers to provide enhanced driving range, capabilities for autonomous vehicle driving, and other innovations, can improve the driving experience, thus ensuring that electrified vehicles will continue to gain in popularity. As investments continue to be made in electrified vehicle research and development, the electrified vehicles of tomorrow are likely to include additional features that are expected to make electrified vehicles even more attractive and provide an even more pleasant driving experience.

However, as the features and capabilities of electrified vehicles increase, complexity of certain aspects of maintaining an electrified vehicle may also increase. For example, although many electrified vehicles facilitate capabilities such as bidirectional charging, in which energy stored within the batteries of an electrified vehicle may be used to provide primary AC power to power one or more pieces of external equipment, even the most seasoned drivers of electrified vehicles can occasionally be unsure as to how to initiate certain operations. In another example, in view of the availability of various modes for charging electrified vehicles, such as charging operations that involve 120-volt AC current, 240-volt AC current, and 480-volt AC current, many drivers remain unfamiliar with at least some charging operations, such as those encountered at commercial (e.g., roadside) charging stations. Further, in view of nonuniformities of electrified vehicle support equipment (EVSE) available, some drivers may encounter charging equipment that they have not utilized in the past. Further, such unfamiliarity may be compounded since electrified vehicle charging current is not visible in the conventional sense since an electric current is not viewable in the same manner as liquid fuel as such fuel is being dispensed into a vehicle fuel container for use by an internal combustion engine. Accordingly, it may be useful to provide enhanced assistance and guidance to electrified vehicle drivers, so as to maintain the positive aspects of electrified vehicle ownership.

In one or more future electrified vehicles, a capability for augmented reality (AR) glasses, an AR head-up display, or some other type of AR device may be included. Such AR capabilities may provide the ability for a driver and/or passenger to view icons and/or textual descriptions of, for example, EVSE facilities along the path of travel, eating establishments, points of interest, and so forth. Thus, at least in some instances, while a driver is engaged in controlling the vehicle, the driver may be capable of viewing vehicle warning symbols and/or text, which may provide the driver with real-time advisory and/or warning symbology, thus enhancing driver and passenger safety. In particular instances, at least particular content may be displayed based on the direction or orientation of the AR glasses. Accordingly, as a driver or passenger gazes in a leftward direction, content relevant to establishments located in a leftward direction may be displayed. In addition, as the driver or passenger exits the vehicle while wearing AR glasses, non-driving content may be displayed, such as detailed menus for eating establishments, detailed information regarding points-of-interest, and so forth.

Electrified vehicles may additionally provide a capability for a display of virtual reality content. One such example may include displaying a rendering of the vehicle, such as on a dashboard infotainment display, showing the electrified vehicle in relation to detected (or estimated) surroundings. Accordingly, when conducting certain vehicle operations, such as backing into a parking space, vehicles and/or objects in the environment of the electrified vehicle may be displayed. Thus, in certain instances, a driver may rely on a virtual reality display to safely parallel park, for example, the electrified vehicle on a crowded city street, while maintaining a safe distance between the electrified vehicle and other vehicles.

Thus, in particular embodiments, AR technology, VR technology, and combinations of such technologies may be utilized to provide electrified vehicle driver assistance. Thus, for example, prior to initiating a charging operation, perhaps utilizing EVSE that is unfamiliar to a driver, AR and/or VR technologies may be employed to assist the driver in charging the electrified vehicle. In some instances, based on selection of a particular charging topic, such as fast charging involving coupling a 480-volt AC current to a charging receptacle, a driver may view AR graphics showing which charging cable is most appropriate for the selected charging operation. In addition, AR glasses may indicate text and/or graphics to assist the driver in determining the manner of coupling the selected charging cable to the proper onboard receptacle. Such graphics and/or text may be accompanied by visual instructions, also presented via AR glasses, indicating any vehicle and/or charger settings that facilitate a selected mode of charging.

In certain embodiments, VR technology may be utilized to display, for example by way of an onboard infotainment display, electrified vehicle driver assistance. For example, prior to exiting a vehicle to utilize EVSE, an onboard infotainment display may render a driver approaching, for example, the support equipment, selecting an appropriate cable, inserting the cable into an opened hatch of the electrified vehicle, and so forth. Accordingly, regardless of whether AR glasses are utilized or VR displayed via an infotainment display, a driver may be assured that they are utilizing both the vehicle onboard equipment and the support equipment in an appropriate manner. In addition, in particular embodiments, upon completion of a charging operation, a driver or other user's mobile communications device may be utilized as a notification device, which may advise the user when a charging operation has been completed. Accordingly, in an example scenario, a driver may couple a charging cable to an electrified vehicle, leave the vehicle to obtain a meal, and be notified upon completion of the charging operation. In such a scenario, in addition to being notified of completion of a charging operation, a driver, or passenger, may be provided with real-time status, an indication of the time remaining to a full charge, a charging rate, and so forth.

Further, vehicle assistance may be provided in connection with operations other than vehicle charging operations. For example, vehicle assistance via AR and/or virtual reality may be provided in connection with operations such as replacing cabin air filters, replacing windshield wipers, adding windshield wiper fluid, checking tire air pressure, interfacing with advanced vehicle diagnostic screens, and a host of other vehicle maintenance operations. In these instances, and potentially others, a driver, passenger, or even maintenance personnel may be assured that they are correctly and efficiently servicing the electrified vehicle.

As the term is used herein, an "augmented reality device" or "AR device" refers to any device that permits viewing of a real scene (also referred to as a physical scene) that includes one or more real objects (also referred to as one or more physical objects) through one or more screens (e.g., transparent lenses of AR glasses), and also permits viewing of artificial objects (also referred to as virtual objects), which may be overlaid over the real scene on the screen (e.g., overlaid on the one or more transparent lenses). Accordingly, an AR device may include glasses, for example, which permit viewing of real objects in a scene augmented with artificial (e.g., computer-generated) content. Thus, in an example, a passenger or an operator (e.g., driver) of an electrified vehicle may use an AR device to view real objects in the vehicle's environment, such as other vehicles, traffic signs, lane markings, etc., along with computer-generated visual features (e.g., symbols, text, or the like). In this example, the visual content presented by the AR device may identify, for example, the real objects in the vehicle's environment, along with computer-generated text and/or icons that may provide vehicle assistance related content and/or metadata that describes or otherwise relates to the real objects. The AR device in this example may be AR glasses. In another example, an AR device may include a projector to display imagery on a vehicle windshield, in which such imagery identifies real objects viewable through the windshield or provides vehicle assistance related content and/or metadata respective of the real objects. As the term is used herein, a "virtual reality device" or "VR device" refers to any device that permits viewing of a virtual scene, such as a scene that is entirely, or at least substantially, a computer-generated two or three dimensional scene. Accordingly, virtual reality may utilize a headset, which utilizes pose tracking of a user's eyes to create a virtual scene. Virtual reality may also utilize a conventional display, such as an infotainment display of an electrified vehicle, to display computer-generated imagery. As the term is used herein "vehicle assistance content" refers to content that is related or relevant to assisting a driver, passenger, maintenance personnel etc., in performing a task that is unrelated to vehicle driving. Accordingly, as an example, vehicle assistance may relate to initiating charging operations, performing service and/or maintenance functions, vehicle repair, or any other non-driving-related function.

It should be noted that an AR or VR device, or other device (e.g., a computing device) that provides content to an AR or VR device, may utilize signals from a satellite positioning system to estimate, resolve, or otherwise determine a current location of an electrified vehicle. Accordingly, based on an electrified vehicle being located at a particular charging station, assistance with utilizing EVSE at such a location may be provided to an AR or VR device. Thus, generated AR or VR content may correspond to the specific EVSE encountered at the location. A driver of an electrified vehicle, an operator, or other person may therefore be assured that the assistance and/or guidance provided is substantially or completely appropriate for the particular location.

In view of the description of a general, overarching communications infrastructure as shown and described in reference to FIG. 9 herein, more particular embodiments directed toward providing vehicle assistance via one or more content delivery modes are discussed hereinbelow. Hence, FIG. 1 (embodiment 100) is a diagram of an electrified vehicle having wireless connectivity with a communications infrastructure, which operates to provide vehicle assistance based on a query from a driver, for example, of vehicle 102. In the embodiment of FIG. 1, a driver, passenger, maintenance person, or other party may initiate delivery of content relating to vehicle assistance by engaging in a user interface mounted on dashboard 605, described in greater detail in reference to FIG. 6 herein. For example, a driver of vehicle 102 may manipulate user input device 125 to select a menu item pertaining to, for example, "Vehicle Assistance," and may further select an assistance topic, such as charging (e.g., unidirectional, bidirectional, etc.) or any other assistance topic. Within an assistance topic, a wide variety of subtopics may be displayed, and claimed subject matter is intended to embrace display of all such topics, virtually without limitation. In particular embodiments, user input device 125 may include a microphone which may convert, for example, a driver's voice to a text file. Under the control of processor 115 coupled to memory device 120, input signals from user input device 125 may be structured, modulated, and transmitted to a centralized vehicle assistance content data storage (326), as discussed in greater detail in reference to FIG. 3 herein.

In particular embodiments, based on signals originating from vehicle assistance content data storage 326, options for delivery of vehicle assistance topics may be displayed via infotainment display 140. In an example, based on vehicle assistance content being available via a virtual reality display, vehicle assistance delivery mode controller 135 may facilitate driver selection of such content by way of infotainment display 140. Based on vehicle assistance topics corresponding to one or more selections received or obtained via user input device 125, infotainment display 140 may present any number of applicable topics. In an example, based on a driver of vehicle 102 requesting assistance concerning "Vehicle Charging," vehicle assistance delivery mode controller may present options relating to, for example, 120-volt charging, 240-volt charging, 480-volt charging, bidirectional charging, and so forth. Alternatively, or in addition to, based on vehicle assistance content being available in a VR format and in an AR format, vehicle assistance delivery mode controller may facilitate VR content delivery to infotainment display 140 as well as AR content delivery to AR glasses 145. Accordingly, at least in particular embodiments, a driver of vehicle 102 may be presented with a choice as to which delivery mode is preferred.

Viewing of vehicle assistance related AR content by a passenger and/or a driver of vehicle 102 may be facilitated by vehicle assistance controller 110, shown in FIG. 1. In particular embodiments, vehicle assistance controller 110 may correspond to a computing device (e.g., infotainment system controller and/or telematics control unit (TCU)) that forms or is part of a head-mounted unit that provides a human machine interface (HMI), and may include processor(s) 115 and memory device(s) 120 (which may also be referred to as non-transitory computer-readable medium/media). Memory device(s) 120 may include instructions that are executable by processor(s) 115, including instructions for vehicle assistance delivery mode controller 135, which may receive signals from a location estimation module on board vehicle 102. In particular embodiments, location estimation may be performed utilizing signals from a satellite positioning system (e.g., GPS). In particular embodiments, vehicle assistance controller 110 may include an input port, which receives signals from user input device 125

(also referred to as a HMI), also referred to as a user interface signal. Additional implementation details with respect to a passenger's or an operator's selection of various vehicle assistance topics selectable via user input device 125, are described in greater detail with respect to additional figures described hereinbelow.

Figure 9:
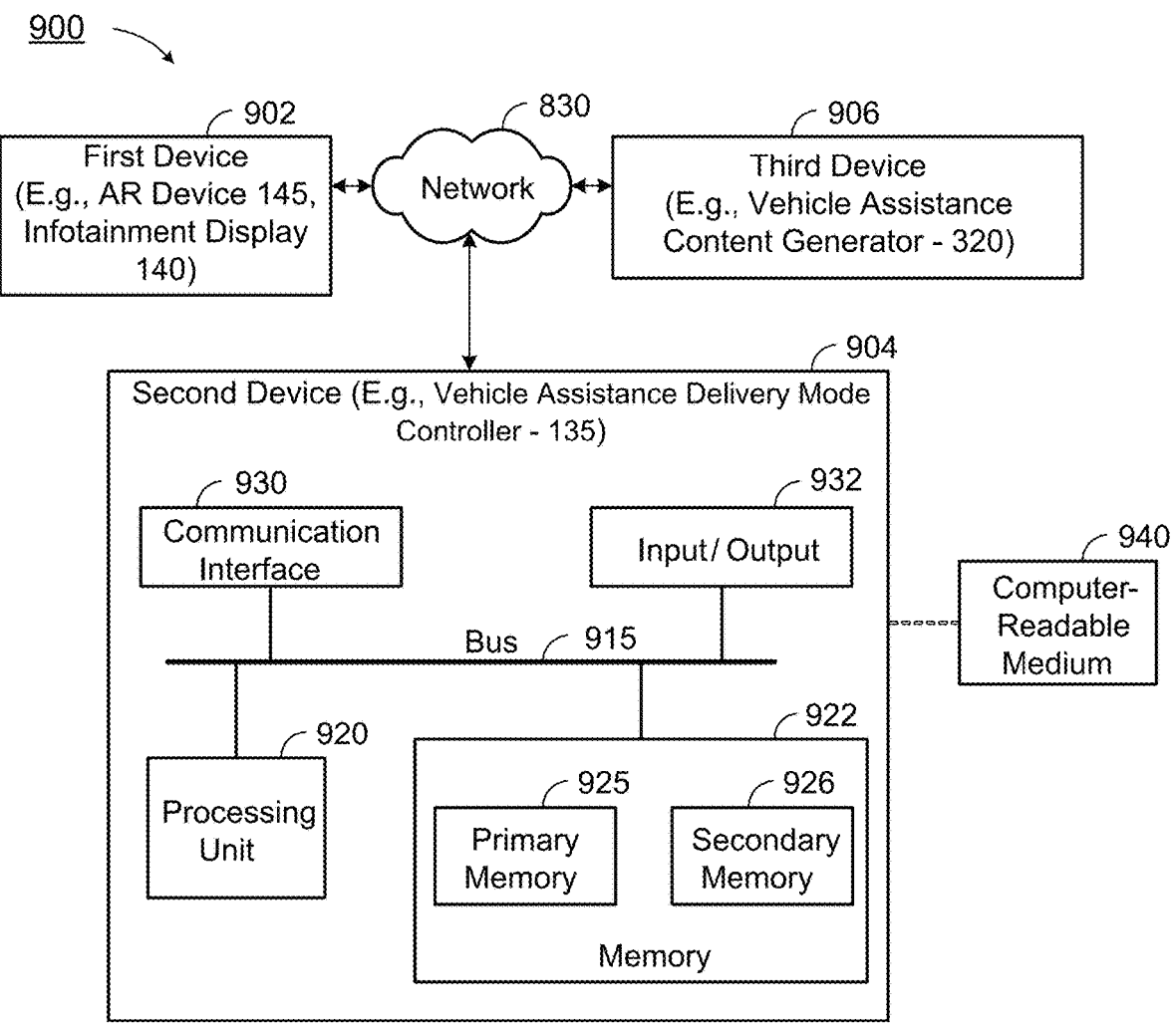
FIG. 9 is a diagram showing a computing environment, according to an embodiment.

Vehicle assistance controller 110 may additionally receive input signals corresponding to positioning signals other than satellite positioning signals, which may include positioning signals transmitted from terrestrial-based cellular transceivers (e.g., cellular transceiver 810 of FIG. 9). In the embodiment of FIG. 1, such positioning signals may be utilized to facilitate delivery of AR and/or VR content relevant to a particular estimated location of vehicle 102. Accordingly, based on vehicle 102 being located at a particular charging station, for example, vehicle assistance content database may be capable of providing vehicle assistance that is specific to the particular charging station. Such content may be formatted and delivered to one or more of infotainment display 140 (e.g., for VR content) and/or to AR glasses 145.

In the embodiment of FIG. 1, AR glasses 145 may obtain positioning information from vehicle 102, either by way of a communications link directly with vehicle 102 or by way of a communications link with one or more cellular communications devices perhaps carried by a driver or a passenger of vehicle 102. Accordingly, AR glasses 145 may, in cooperation with geolocation capabilities of vehicle 102, determine and/or report a location of AR glasses 145 as well as an orientation of the field of view of AR glasses 145. In particular embodiments, orientation of the field of view of AR glasses 145 may be determined via output signals from at least one magnetometer or other type of sensor located within, or at least coupled to, AR glasses 145. Thus, AR glasses 145 may allow a driver, passenger, or other individual wearing the glasses and located perhaps proximate to or within vehicle 102 to view real objects within the field of view of AR glasses 145 as well as view computer-generated objects, which may be displayed via a semi-transparent display of AR glasses 145 and overlaid on the real objects. Thus, a driver, passenger, or other individual proximate to vehicle 102 may be capable of viewing real objects, and view modifications or augmentations to the real objects via a layer of computer-generated objects or other features. Computer-generated features (e.g., computer-generated objects) may include symbols, such as arrows, triangles, solid, dotted and dashed lines, and any number of other shapes, which may include a variety of colors. Computer-generated objects may include alphanumeric characters which, in this setting, refer to characters of a standard alphabet (e.g., 26 characters of the English alphabet, 27 characters of the German alphabet, etc.) and numeric characters 0-9. Accordingly, for example, an alphanumeric message may include a single alphabetical character, such as "A," multiple alphabetical characters, such as "ABCDE," single or multiple numeric characters, such as "1," or "123," as well as combinations thereof, such as "ABC123 . . . ," "A1B2C3 . . . ." Further, AR glasses 145 may display computer-generated symbols, such as graphical icons indicating instructions overlaid on a real image, such as an image of the driver's hand opening a charging hatch of vehicle 102, grasping a charging cable, and/or any number of additional symbols or characters, and claimed subject matter is not limited in this respect.

AR glasses 145 may correspond to any of several candidate AR devices, which may include AR helmets, AR displays (e.g., a head-up display), an AR windshield, or the like. In one possible (and nonlimiting) embodiment, AR glasses 145 correspond to the Microsoft® HoloLens system. Such AR glasses include see-through holographic lenses, head tracking capabilities, inertial measurement capabilities utilizing accelerometers, gyroscopes, at least one magnetometer, built-in spatial sound, and other sensing capabilities. It should be noted that claimed subject matter is intended to embrace the above-identified device as well as any and all augmented and/or mixed reality glasses, virtually without limitation.

Figure 2:
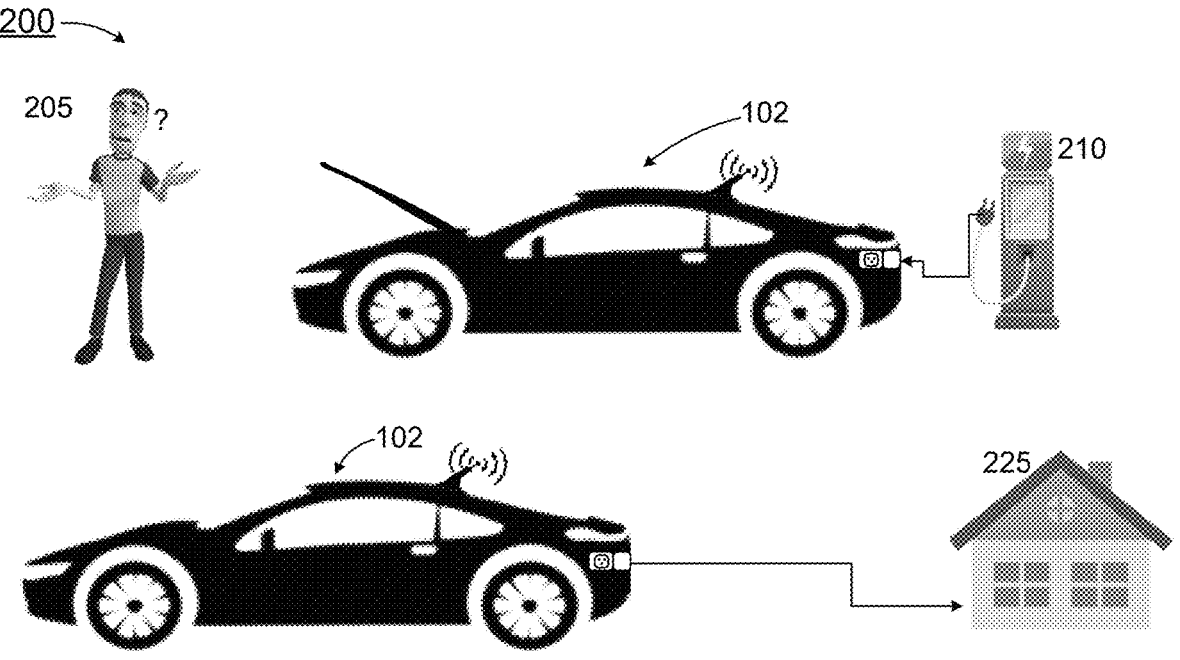
FIG. 2 is a diagram of a driver of an electrified vehicle attempting to initiate a charging operation, according to an embodiment.

FIG. 2 is a diagram of a driver of an electrified vehicle attempting to initiate a charging operation, according to an embodiment 200. As indicated in FIG. 2, driver 205 may express some level of confusion as to how to operate EVSE 210, which may correspond to a charger located at an electrified vehicle charging station. As previously alluded to herein, EVSE 210 may correspond to a type of charging apparatus, such as a charging apparatus that driver 205 has not utilized in the past, has not utilized in a particular charging mode, or may otherwise be uncomfortable with operating. Such assistance may include opening a vehicle charging port or hatch, placing the vehicle into a particular charging mode, selecting the appropriate cable to facilitate charging, etc. In another embodiment, driver 205 may desire assistance in performing another service aspect to vehicle 102, such as replacing windshield wiper blades, adding air or other gas (e.g., nitrogen) to one or more tires of vehicle 102, for example. In an embodiment, driver 205 may desire assistance in placing vehicle 102 into a mode that facilitates bidirectional charging, which may be desired in response to a power failure at the driver's residence 225. In response to driver 205 interfacing with vehicle 102, such as via a voice recognition capability of vehicle 102 and/or via manipulating controls of infotainment display 140 described in reference to FIG. 1, driver 205 may initiate obtaining vehicle assistance. Responsive to vehicle assistance being available, or being desired, via delivery of VR content, driver 205 may view infotainment display 140. Responsive to vehicle assistance being available, or being desired, via delivery of AR content, driver 205 may wear AR glasses 145 described in reference to FIG. 1.

As previously alluded to with respect to the embodiment of FIG. 2, AR glasses 145 may cooperate with vehicle 102 perhaps by way of a cellular or other type of wireless link between AR glasses 145 and vehicle 102. Such communication may provide information indicating a present location and orientation of the field-of-view of glasses 145. As also stated above, vehicle assistance controller 110 may receive content from a content generator, such as vehicle assistance content generator 320 of FIG. 3.

Figure 3:
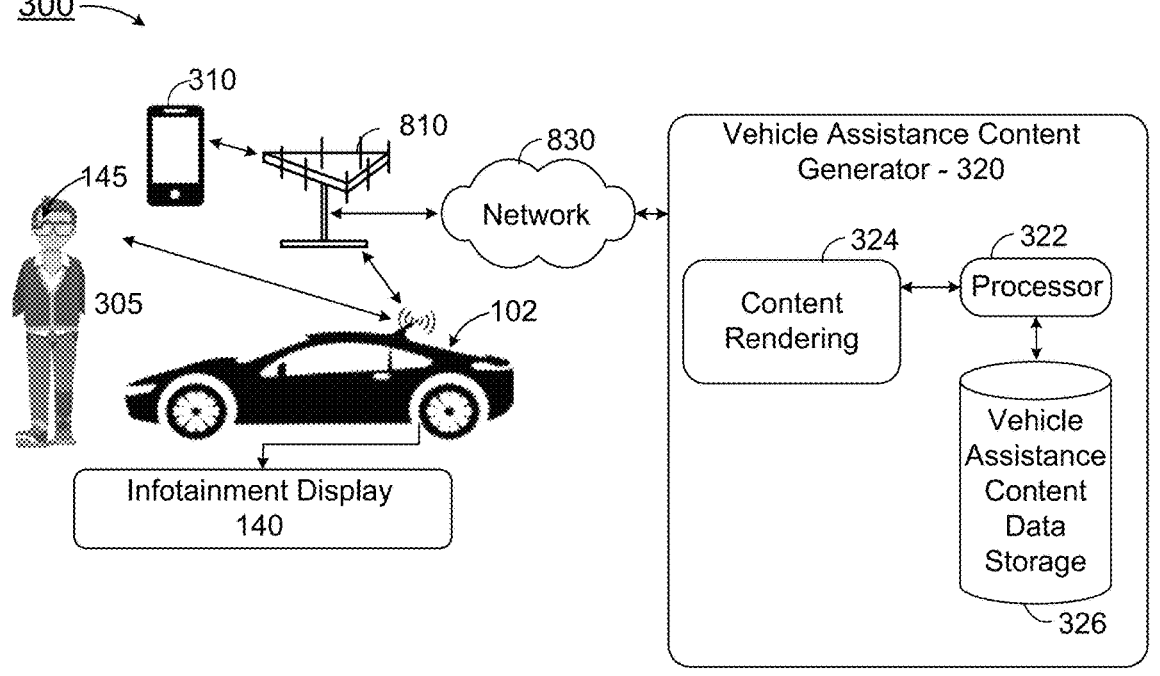
FIG. 3 is a diagram of an electrified vehicle in communication with a cloud-based content data storage to provide vehicle assistance via one or more content delivery modes, according to an embodiment.

FIG. 3 is a diagram of an electrified vehicle in communication with a cloud-based content database to provide vehicle assistance via one or more content delivery modes, according to an embodiment 300. Signals and/or other encoded parameters representing a present location and a field-of-view of vehicle 102 may be transmitted to cellular transceiver 810 and through network 830 (such as described in reference to FIG. 8) to arrive at vehicle assistance content generator 320. In addition, signals and/or other encoded parameters representing an assistance topic selected by driver 205, for example, via manipulating infotainment display 140 may also be transmitted to vehicle assistance content generator 320. Responsive to receipt of an estimated position of vehicle 102, and orientation of the field-of-view of glasses 145, vehicle assistance content generator 320 may operate to provide content that is relevant to or otherwise associated with real objects visible within the field-of-view of glasses 145. Vehicle assistance content generator 320 may utilize the estimated location of vehicle 102, so as to provide content that is specific to a charging station, or other service facility, corresponding to the present, estimated location of vehicle 102. In the embodiment of FIG. 3, vehicle assistance content generator 320 includes processor 322 (e.g., including one or more computer processors), which may communicate with a content rendering module 324 to format content suitable for transmitting to AR glasses 145. Content suitable for transmitting to AR glasses 145 may be determined responsive to processor 322 communicating with vehicle assistance content data storage 326 (also referred to as a data storage device), which may include a memory device to store descriptors relating to real objects visible at locations within the field-of-view of AR glasses 145. Vehicle assistance content generator 320 may then transmit content via network 830, and through cellular transceiver 810 for delivery to vehicle 102 (or for delivery to a device of an individual co-located with or proximate with vehicle 102.)

Alternatively or in addition to AR content, vehicle assistance content generator 320 may provide VR vehicle assistance content for display, such as by way of infotainment display 140 of vehicle 102. Accordingly, vehicle assistance content generator 320 may query vehicle assistance content data storage 326 to supply stored imagery that is particular to a service facility corresponding to an estimated location of vehicle 102. Such imagery may be transmitted via network 830 and to cellular transceiver 810 to arrive at vehicle 102. Imagery corresponding to the service facility, along with appropriate icons and/or text, may assist driver 305 in charging the vehicle in a specified mode or engaging in any other vehicle service to be performed at the particular service facility. In an example, VR imagery may include imagery that relates to locating a charging hatch or port on vehicle 102, imagery that relates to assistance in placing the vehicle into a particular charging mode, selecting an appropriate charging cable, and so forth.

Vehicle assistance content generator 320 may additionally communicate via network 830 and cellular transceiver 810, so as to provide notifications to cellular communications device 310 in the possession of (or colocated with) driver 305. In particular embodiments, cellular communications device may execute a host application, which cooperates with vehicle 102 to facilitate user input, thereby performing at least some features performed by user input device 125 of FIG. 1. Vehicle assistance content generator 320 may notify driver 305, via cellular communications device 310, that a charging operation has been completed and/or to notify driver 305 of the status of an ongoing charging operation. Thus, based on driver 305 receiving a notification that a charging operation is expected to be complete within a 10-minute time period, just as an example, driver 305 may wish to return to vehicle 102. Upon completion of a charging operation, driver 305 may detach a charging cable from vehicle 102 and exit the charging facility.

Figure 4:
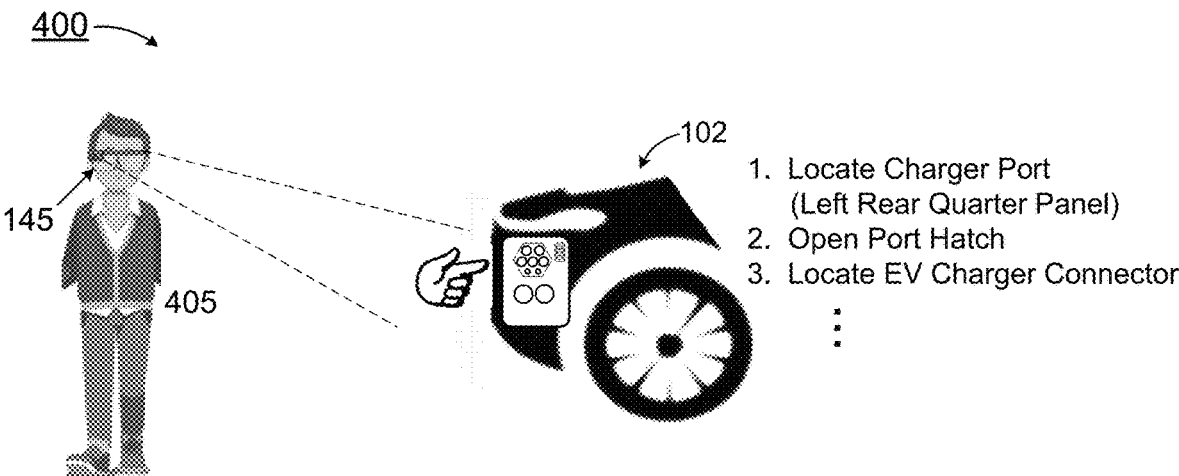
FIG. 4 is a diagram of a driver of an electrified vehicle receiving vehicle assistance via augmented reality glasses according to an embodiment.

FIG. 4 is a diagram of a driver of an electrified vehicle receiving vehicle assistance via AR glasses according to an embodiment 400. As depicted in FIG. 4, driver 405 wearing AR glasses 145 may oriented their gaze toward the left rear quarter panel of vehicle 102. Based on signals identifying the orientation and position of AR glasses 145, AR imagery may be presented, which may exaggerate a charging port or hatch of vehicle 102. Such AR imagery may be accompanied by text, which instructs driver 405 to open the charging hatch, locate the appropriate electrified vehicle charge connector, and so forth. Driver 405 may be presented with a wide variety of additional imagery via AR glasses 145, and claimed subject matter is not limited in this respect. Alternatively, or in addition to, imagery representing driver 405 located near the left rear quarter panel of vehicle 102 may be presented by way of VR imagery displayed via infotainment display 140 of FIG. 1. Displayed imagery may be accompanied by text and/or graphics, such as a rendition of the driver's hand, which may assist driver 405 in performing charging or other vehicle-related operations.

Figure 5:
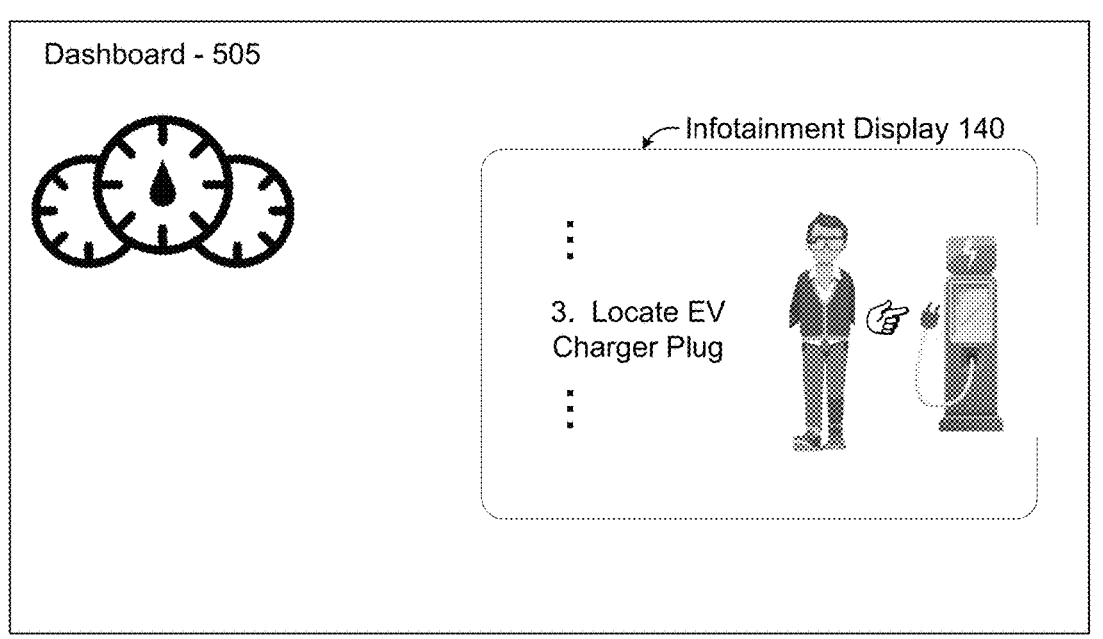
FIG. 5 is a diagram of an infotainment display of an electrified vehicle showing a virtual reality image of a driver manipulating electrified vehicle support equipment, according to an embodiment.

FIG. 5 is a diagram of an infotainment display of an electrified vehicle showing a virtual reality image of a driver manipulating EVSE, according to an embodiment 500. As shown in FIG. 5, dashboard 505 may include infotainment display 140. Infotainment display 140 may display a VR image of driver 405 and EVSE that may be encountered at the estimated location of vehicle 102.

FIG. 6 is a first flowchart for a method of vehicle assistance via one or more content delivery modes, according to an embodiment 600. In particular embodiments, the operations of FIGS. 6-7 may be performed via vehicle assistance controller 110 of FIG. 1 in at least occasional communication with vehicle assistance content generator 320 of FIG. 3.

Embodiments in accordance with claimed subject matter may include all of the operations depicted at 605-695 and 705-715 (described hereinbelow), fewer operations than those depicted at 605-695 and 705-715 and/or more operations than those depicted at 605-695 and 705-715. Likewise, it should be noted that content acquired or produced, such as, for example, input signals, output signals, operations, results, etc., brought about by the example processes described with respect to embodiments 600 and 700 may be represented via one or more digital signals. It should also be appreciated that even though one or more operations are illustrated or described concurrently or with respect to a certain sequence, other sequences or concurrent operations may be employed. In addition, although the description below references particular aspects and/or aspects illustrated in certain other figures, one or more operations may be performed with other operations and/or aspects.

The method of FIG. 6 may begin at operation 605, which may include accessing a user input device to receive or obtain a vehicle assistance topic. As previously noted herein, a vehicle assistance topic may include topics related to vehicle charging (e.g., unidirectional charging, bidirectional charging, etc.) or any other maintenance or servicing of an electrified vehicle, such as vehicle 102. A user input device may include a touchscreen of a vehicle infotainment display, such as infotainment display 140 described hereinabove. A user input device may additionally include a microphone, which permits a driver, passenger, or other individual to receive voice signals to be digitized via a processor, such as processor 115 of FIG. 1.

The method may continue at operation 610, in which an assistance topic may be transmitted in the form of a query to cloud-based vehicle assistance content generator 320 described in reference to FIG. 3. Operation 610 may additionally include vehicle 102 transmitting an estimated location to vehicle assistance content generator 320. The method may continue at operation 615, in which vehicle assistance content generator 320 may determine whether VR content relevant to the transmitted query, corresponding to the present estimated location of vehicle 102, is available within vehicle assistance content data storage 326. At operation 615, based on VR content being available for the estimated location of vehicle 102, operation 620 may be performed, which may include transmitting or returning a listing of relevant identifiers of available VR content. Based on the decision of operation 615 indicating that VR content is not available for a selected assistance topic, operation 625 is performed, which may include returning a null identifier, to indicate that VR content relevant to the estimated location of vehicle 102 is not currently available.

The method may continue at operation 630 in which vehicle assistance content generator 320 may determine whether AR content relevant to the transmitted query corresponding to the estimated location of vehicle 102 is available. Based on relevant AR content not being available, the method may proceed to operation 625, in which the driver, for example, may be given an opportunity to refine a query, such as by entering or enunciating additional descriptors at operation 695, so that the query can be resubmitted, such by returning to operation 615. A refined query may result in vehicle assistance content generator 320 overlaying additional text and/or graphical content responsive to submitted additional query descriptors.

Based on relevant AR content being available, operation 635 may be performed, which may include transmitting or returning a listing of relevant identifiers of available AR content. The method may continue at operation 640, in which VR and/or AR content may be displayed to the driver, for example, of vehicle 102. Content display may be facilitated via infotainment display 140 and/or via AR glasses 145. The method may continue at operation 645, which may include receiving, obtaining, or accessing one or more input signals initiated by a driver, for example, of vehicle 102 indicating that a vehicle assistance operation, such as charging the vehicle in a selected mode, for example, has been successfully completed. The method may continue at operation 650, which may include displaying an end prompt via infotainment display 140 and/or AR glasses 145. Based on an indication, such as at 645, that a vehicle assistance operation has not been successfully completed, operation 655 may be performed, in which additional (e.g., second) content may be displayed to the driver of vehicle 102, for example. At operation 660, based on additional content being available, the method may return to operation 640 in which additional AR content relevant to an assistance topic may be displayed. It may be appreciated that operations 640, 645, 655, and 660 may form an iterative set of operations in which AR content is displayed to a driver (operation 640), for example, followed by the driver determining that the issue has not been resolved (operation 645), incrementing the next item of content to be presented (operation 655), determining that additional content is available (operation 660), and returning to operation 640. Based on no additional content being available, the method advances to operation 625, in which a null ID is returned or transmitted by vehicle assistance content generator 320.

Returning briefly to operation 625, based on vehicle assistance content generator 320 returning a null ID to indicate that no on-topic AR or VR content is available, the method advances to operation 665, in which vehicle assistance content generator stores a record of the driver query in vehicle assistance content data storage 326. Storage of such records may provide notification that the driver query may not have been satisfactorily answered, which may bring about a request for additional content to be added to vehicle assistance content data storage 326. The method may continue at operation 670, which may include updating a station rating, which may advise other drivers, passengers, and/or maintenance personnel to perhaps avoid a particular servicing location in favor of alternative facilities for charging vehicles similar to vehicle 102. The method may continue at operation 675, which may include transmitting an assistance phone number to vehicle 102 so that the driver, for example, can obtain assistance via a telephone connection. The method may continue at operation 680, in which vehicle assistance content generator 320 may cooperate with vehicle assistance content controller 110 to determine whether energy storage cells of vehicle 102 (e.g., batteries) presently include a sufficient state of charge (SOC) to proceed to an alternative station. Based on a determination that sufficient SOC is present in batteries, for example, of vehicle 102, operation 690 may be performed in which, vehicle assistance controller 110 may plan a route to the alternative station. Based on a determination that sufficient SOC is not present in batteries, for example, of vehicle 102, operation 685 may be performed, in which a driver assistance organization may be contacted to provide additional assistance to, for example, the driver of vehicle 102.

FIG. 7 is a second flowchart for a method of vehicle assistance via one or more content delivery modes, according to an embodiment 700. The method of FIG. 7 may begin at operation 705, which may include accessing a user input device (e.g., user input device 125 of FIG. 1) to determine an assistance topic for charging and/or discharging one or more energy storage elements (e.g., batteries) of an electrified vehicle (e.g., vehicle 102). The method may continue at operation 710, in which a determination is made as to whether VR content or AR content is available based on the accessing of the user input device as described in reference to operation 705. The method may continue at operation 715, which may include delivering the content to one or more display devices via the determined delivery mode.

Figure 8:
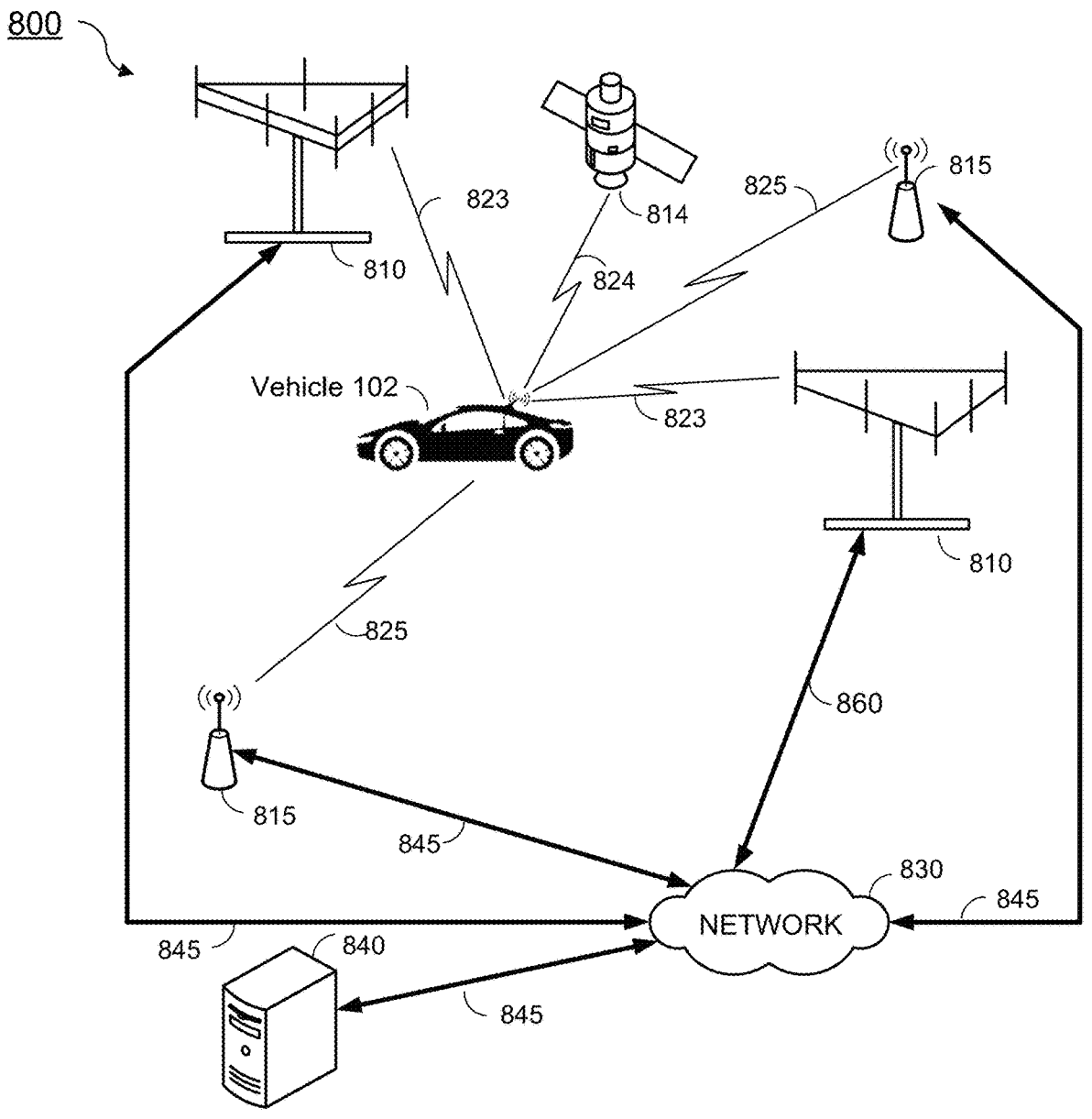
FIG. 8 is a diagram of a communications infrastructure that includes both wireless and wireline communications devices and components, according to an embodiment.

FIG. 8 is a diagram of a communications infrastructure that includes both wireless and wireline communications devices and components, according to an embodiment 800. It may be appreciated that the communications infrastructure of FIG. 8 may be utilized to provide wireless communication between vehicle 102 and vehicle assistance content generator 320. Vehicle 102 may provide such communications with the communications infrastructure of FIG. 8 either as an embedded capability, or via a connection, such as a Bluetooth connection, with any of several types of mobile cellular communications devices (e.g., cellular communications device 310 of FIG. 3). Such capabilities may include telephone communications, texting, web browsing, providing wireless hotspot capability, and so forth. In the embodiment of FIG. 8, vehicle 102 may, either as an embedded capability or via a wired or wireless connection with mobile cellular communications device 310, transmit radio signals to, and receive radio signals from, a wireless communications network. In an example, vehicle 102 may facilitate communications with a cellular communications network by transmitting wireless signals to, and/or receiving wireless signals from, a cellular transceiver 810, which may include a wireless base transceiver subsystem, a Node B or an evolved NodeB (eNodeB), over wireless communication link 823. Similarly, vehicle 102 may transmit wireless signals to, and/or receive wireless signals from, local transceiver 815 over wireless communication link 825. Local transceiver 815 may include an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 810, local transceiver 815, satellite 814, represent touchpoints, which permit vehicle 102 to interact with network 830.

In a particular implementation, cellular transceiver 810 and local transceiver 815 may communicate with server 840, such as by way of network 830 via communication links 845. Here, network 830 may include any combination of wired or wireless links and may include cellular transceiver 810 and/or local transceiver 815 and/or server 840. In a particular implementation, network 830 may include Internet Protocol (IP) or other infrastructure capable of facilitating communication between vehicle 102 at a call source and server 840 through local transceiver 815 or cellular transceiver 810. In an embodiment, network 830 may also facilitate communication between vehicle 102 and server 840, for example, through communications link 860. In another implementation, network 830 may include a cellular communication network infrastructure such as, for example, a base station controller or packet based or circuit based switching center (not shown) to facilitate mobile cellular communication with vehicle 102. In a particular implementation, network 830 may include local area network (LAN) elements such as Wi-Fi APs, routers and bridges and may, in such an instance, include links to gateway elements that provide access to wide area networks such as the Internet. In other implementations, network 830 may include a LAN and may or may not involve access to a wide area network but may not provide any such access (if supported) to vehicle 102. In some implementations, network 830 may include multiple networks (e.g., one or more wireless networks and/or the Internet). In one implementation, network 830 may include one or more serving gateways or Packet Data Network gateways. In addition, one or more of server 840 may include an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 830.

In particular embodiments, communications between vehicle 102 and cellular transceiver 810, satellite 814, local transceiver 815, and so forth may occur utilizing signals communicated across wireless or wireline communications channels. Accordingly, the term "signal" may refer to communications utilizing propagation of electromagnetic waves or electronic signals via a wired or wireless communications channel. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in one or more signals using one or more of the above-identified modulation techniques.

In particular implementations, and as discussed below, vehicle 102 (e.g., as an embedded capability or via a wired or wireless connection with an individual's mobile cellular communications device) may include circuitry and processing resources capable of obtaining location related measurements (e.g., for signals received from GPS or other satellite positioning system (SPS) satellites 814), cellular transceiver 810 or local transceiver 815 and possibly computing a position fix or estimated location of vehicle 102 based on these location related measurements. In some implementations, location related measurements obtained by vehicle 102 may be transferred to a location server such as an enhanced serving mobile location center (E-SMLC) or SUPL location platform (SLP) (e.g. which may include a server, such as server 840) after which the location server may estimate or determine an estimated location for vehicle 102 based on the measurements. In the embodiment of FIG. 8, location-related measurements obtained at vehicle 102 may include measurements of signals 824 received from satellites belonging to an SPS or Global Navigation Satellite System (GNSS) such as GPS, GLONASS, Galileo or Beidou and/or may include measurements of signals (such as 823 and/or 825) received from terrestrial transmitters fixed at known locations (e.g., such as cellular transceiver 810).

Vehicle 102, either as an embedded capability or via a wired or wireless connection with an individual's mobile cellular communications device, may obtain a location estimate for vehicle 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at vehicle 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at vehicle 102. Here, server 840 may be capable of providing positioning assistance data to vehicle 102 (or to an individual's mobile cellular communications device within vehicle 102) including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 840 may include an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, vehicle 102 may obtain measurements of signal strengths for signals received from cellular transceiver 810 and/or local transceiver 815 and/or may obtain a round trip signal propagation time (RTT) between vehicle 102 and a cellular transceiver 810 or local transceiver 815. Vehicle 102 may use these measurements together with assistance data (e.g. terrestrial almanac data or GNSS satellite data such as GNSS Almanac and/or GNSS Ephemeris information) received from server 840 to determine a location estimate for vehicle 102 or may transfer the measurements to server 840 to perform the same determination. A call from vehicle 102 may be routed, based on the location of vehicle 102 via wireless communication link 823 and communications link 860.

In response to receipt of signals from GPS or from other satellite positioning system (SPS) satellites, or in response to other positioning approaches, such as those described hereinabove, vehicle 102 for example, may compute or estimate its location. In particular embodiments, an outcome of a location estimation process may be expressed utilizing three variables, such as latitude, longitude, and elevation. However, in particular embodiments an estimated or computed position may take any other form, such as to express coordinates in a Universal Transverse Mercator coordinates, or may be expressed utilizing coordinates that accord with World Geodetic System 84 (WGS 84), or may be expressed utilizing any other coordinate system, and claimed subject matter is not limited in this respect.

Responsive to vehicle 102, either as an embedded capability or by way of an interface to an individual's mobile cellular communications device, may include an embedded sensor suite which may, for example, include inertial sensors and environment sensors. Inertial sensors may include, for example accelerometers (e.g., collectively responding to acceleration of vehicle 102 in and x-direction, a y-direction, and a z-direction). Vehicle 102 may further include one or more gyroscopes or one or more magnetometers (e.g., to support one or more compass applications). Environment sensors of vehicle 102 may include, for example, temperature sensors, barometric pressure sensors, ambient light sensors, camera imagers, microphones, just to name few examples. Sensors of vehicle 102 may generate analog or digital signals that may be stored in utilizing one or more memory locations in support of one or more applications such as, for example, applications collecting or obtaining biometric attributes of an individual driver, for example.

FIG. 9 is a diagram showing a computing environment, according to an embodiment. 900. In the embodiment of FIG. 9, first device 902, which may include an AR device (e.g., AR glasses 145) or a VR device (e.g., infotainment display 140) may receive signals, for example, from third device 906, which may correspond to a content generator, such as vehicle assistance content generator 320 of FIG. 3. In the embodiment of FIG. 9, first device 902 may be capable of rendering signals from third device 906 (e.g., content generator) so that a driver and/or a passenger of vehicle 102 may receive text and/or imagery relevant to or associated with real objects viewable through AR glasses 145 (for example). Second device 904, may potentially operate as onboard vehicle assistance delivery mode controller 135 (of FIG. 1), which may generate vehicle assistance related content viewable by the driver and/or a passenger of the vehicle. In FIG. 9, computing device 902 ('first device') may communicate with second device 904, which may, for example, also include features of at least one computer processor coupled to at least one memory device and/or a server computing device. Processor (e.g., including one or more computer processors) 920 and memory 922, which may include primary memory 925 and secondary memory 926, may communicate by way of a communication interface 930, for example. The term "computing device," or "computing resource" in the present patent application, refers to a system and/or a device, such as a computing apparatus that includes a capability to process (e.g., perform computations) and/or store digital content, such as electronic files, electronic documents, measurements, text, images, video, audio, etc. in the form of signals and/or states. Thus, a computing device, in the setting or environment of the present patent application, may include hardware, software, firmware, or any combination thereof (other than software per se). Second device 904, as depicted in FIG. 9, is merely one example, and claimed subject matter is not limited in scope to this particular example.

In FIG. 9, computing device 902 may provide one or more sources of executable computer instructions in the form of physical states and/or signals (e.g., stored in memory states), for example. Computing device 902 may communicate with computing device 904 by way of a network connection, such as via network 830, for example. As previously mentioned, a connection, while physical, may be virtual while not necessarily being tangible. Although second device 904 of FIG. 9 shows various tangible, physical components, claimed subject matter is not limited to a computing devices having only these tangible components as other implementations and/or embodiments may include alternative arrangements that may include additional tangible components or fewer tangible components, for example, that function differently while achieving similar results. Rather, examples are provided merely as illustrations. It is not intended that claimed subject matter be limited in scope to illustrative examples.

Memory 922 may include any non-transitory storage mechanism. Memory 922 may include, for example, primary memory 925 and secondary memory 926, additional memory circuits, mechanisms, or combinations thereof may be used. Memory 922 may include, for example, random access memory, read only memory, etc., such as in the form of one or more storage devices and/or systems, such as, for example, a disk drive including an optical disc drive, a tape drive, a solid-state memory drive, etc., just to name a few examples.

Memory 922 may include one or more articles utilized to store a program of executable computer instructions. For example, processor 920 (which may include one or more computer processors) may fetch executable instructions from memory and proceed to execute the fetched instructions. Memory 922 may also include a memory controller for accessing device readable-medium 940 that may carry and/or make accessible digital content, which may include code, and/or instructions, for example, executable by processor 920 and/or some other device, such as a controller, as one example, capable of executing computer instructions, for example. Under direction of processor 920 (e.g., one or more computer processors), a non-transitory memory medium, such as memory cells storing physical states (e.g., memory states), including, for example, a program of executable computer instructions, may be executed by processor 920 and able to generate signals to be communicated via a network, for example, as previously described. Generated signals may also be stored in memory, also previously suggested.

Memory 922 may store electronic files and/or electronic documents, such as relating to one or more users, and may also include a machine-readable medium that may carry and/or make accessible content, including code and/or instructions, for example, executable by processor 920 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted that an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the setting or environment of the present patent application, and generally, is considered to be a self-consistent sequence of operations and/or similar signal processing leading to a desired result. In the setting or environment of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 920 may include one or more circuits, such as digital circuits, to perform at least a portion of a computing procedure and/or process. By way of example, but not limitation, processor 920 may include one or more processors, such as controllers, micro-processors, micro-controllers, application specific integrated circuits, digital signal processors, programmable logic devices, field programmable gate arrays, the like, or any combination thereof. In various implementations and/or embodiments, processor 920 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 9 also illustrates device 904 as including a component 932 operable with input/output devices, and communication bus 915, for example, so that signals and/or states may be appropriately communicated between devices, such as device 904 and an input device and/or device 904 and an output device. A user may make use of an input device, such as a computer mouse, stylus, track ball, keyboard, and/or any other similar device capable of receiving user actions and/or motions as input signals. Likewise, for a device having voice-to-text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

Unless otherwise indicated, in the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A vehicle assistance controller to convey content to one or more display devices of, or in communication with, a vehicle, the vehicle assistance controller comprising:

at least one memory device to store computer program code;

one or more processors communicatively coupled to the at least one memory device, which, responsive to executing the computer program code, are to:

access a user input device to determine an assistance topic for charging and/or discharging one or more energy storage elements of the vehicle;

determine a delivery mode for the content, which is applicable to the assistance topic, via or based on the access of the user input device, wherein determining the delivery mode comprises determining, based on a user selection associated with the delivery mode, to deliver the content to a display device of the vehicle and a wearable augmented reality display device; and deliver the content to one or more display devices via the determined delivery mode, wherein delivering the content comprises:

delivering virtual reality content to the display device of the vehicle, and delivering augmented reality content to the wearable augmented reality display device.

2. The vehicle assistance controller of claim 1, wherein the one or more processors communicatively coupled to the at least one memory device are further to:

access one or more cloud-based data storage devices to deliver the content applicable to the assistance topic via the determined delivery mode.

3. The vehicle assistance controller of claim 2, wherein the one or more processors communicatively coupled to the at least one memory device are further to:

overlay additional content responsive to access of the user input device to obtain one or more additional user input signals to refine or update the assistance topic.

4. The vehicle assistance controller of claim 3, wherein the overlaid additional content comprises text and or graphics.

5. The vehicle assistance controller of claim 1, wherein the user input device comprises a host application executed utilizing a mobile communications device.

6. The vehicle assistance controller of claim 5, wherein the one or more processors communicatively coupled to the at least one memory device are additionally to:

initiate generation of a message to the mobile communications device to indicate status of charging and/or discharging of the one or more energy storage elements of the vehicle.

7. The vehicle assistance controller of claim 1, wherein the one or more processors communicatively coupled to the at least one memory device are additionally to:

determine whether the one or more energy storage elements of the vehicle comprise sufficient state of charge (SOC) to route the vehicle from a first charging station to one or more second charging stations.

8. The vehicle assistance controller of claim 1, wherein the one or more processors communicatively coupled to the at least one memory device are additionally to:

determine whether the assistance topic relates to charging of the one or more energy storage elements of the vehicle or relates to discharging of the one or more energy storage elements of the vehicle to provide power to one or more pieces of external equipment.

9. The vehicle assistance controller of claim 1, wherein the user input device comprises a microphone to receive voice signals from a user of the user input device.

10. A method to convey content to one or more display devices of, or in communication with, a vehicle, the method being performed by one or more processors and comprising:

accessing a user input device to determine an assistance topic for charging and/or discharging one or more energy storage elements of the vehicle;

determining a delivery mode for the content applicable to the assistance topic via the accessing of the user input device, wherein determining the delivery mode comprises determining, based on a user selection associated with the delivery mode, to deliver the content to a display device of the vehicle or a wearable augmented reality display device; and delivering the content to one or more display devices via the determined delivery mode, wherein delivering the content comprises:

delivering virtual reality content to the display device of the vehicle, and delivering augmented reality content to the wearable augmented reality display device.

11. The method of claim 10, wherein accessing the user input device further comprises:

receiving voice signals, via a microphone, from a user of the user input device.

12. The method of claim 10, wherein delivering the content to the one or more display devices further comprises:

generating augmented reality images, virtual reality images, or a combination thereof.

13. The method of claim 10, further comprising:

accessing one or more cloud-based data storage devices to deliver the content applicable to the assistance topic responsive to the determined delivery mode.

14. The method of claim 10, further comprising:

initiating generation of a message to a mobile communications device, the message indicating status of a charging and/or discharging operation of the one or more energy storage elements of the vehicle.

15. The method of claim 10, further comprising:

determining whether the assistance topic relates to charging the vehicle or relates to discharging of the vehicle to provide power to one or more pieces of external equipment.

16. A non-transitory computer-readable medium comprising program instructions for causing one or more processors of a vehicle assistance controller to perform at least the following:

accessing a user input device to determine an assistance topic for charging and/or discharging one or more energy storage elements of the vehicle;

determining a delivery mode for content applicable to the assistance topic via the accessing of the user input device, wherein determining the delivery mode comprises determining, based on a user selection associated with the delivery mode, to deliver the content to a display device of the vehicle or a wearable augmented reality display device; and delivering the content to one or more display devices via the determined delivery mode, wherein delivering the content comprises:

delivering virtual reality content to the display device of the vehicle, and delivering content comprising augmented reality content to the wearable augmented reality display device.

17. The non-transitory computer-readable medium of claim 16, wherein the program instructions are additionally for causing the one or more processors to:

access one or more cloud-based data storage devices to deliver the content applicable to the assistance topic responsive to the determined delivery mode.

18. The non-transitory computer-readable medium of claim 16, wherein the program instructions are additionally for causing the one or more processors to:

determine whether energy storage elements of the vehicle comprise sufficient state of charge to route the vehicle from a first charging station to one or more second charging stations.

* * * * *